US011586731B2

(12) United States Patent
Bottaro et al.

(10) Patent No.: US 11,586,731 B2
(45) Date of Patent: Feb. 21, 2023

(54) RISK-AWARE ENTITY LINKING

(71) Applicant: Microsoft Technology Licensing, LLC, Redmond, WA (US)

(72) Inventors: Juan Pablo Bottaro, Dublin (IE); Daria Bogdanova, Dublin (IE); Maria Laura Jedrzejowska, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 763 days.

(21) Appl. No.: 16/583,256

(22) Filed: Sep. 26, 2019

(65) Prior Publication Data

US 2021/0097178 A1    Apr. 1, 2021

(51) Int. Cl.
| | | |
|---|---|---|
| *G06F 16/00* | (2019.01) | |
| *G06F 21/56* | (2013.01) | |
| *G06F 16/242* | (2019.01) | |
| *G06F 16/2457* | (2019.01) | |
| *G06N 20/00* | (2019.01) | |
| *G06F 16/21* | (2019.01) | |

(52) U.S. Cl.
CPC .......... *G06F 21/562* (2013.01); *G06F 16/217* (2019.01); *G06F 16/243* (2019.01); *G06F 16/24575* (2019.01); *G06N 20/00* (2019.01); *G06F 2221/032* (2013.01)

(58) Field of Classification Search
CPC .... G06F 21/562; G06F 16/217; G06F 16/243; G06F 16/24575; G06F 2221/032; G06F 16/383; G06F 40/216; G06F 40/247; G06F 40/284; G06F 40/295; G06F 40/30; G06N 20/00; G06N 5/04
See application file for complete search history.

(56) References Cited

U.S. PATENT DOCUMENTS

| | | | | |
|---|---|---|---|---|
| 9,779,135 | B2 * | 10/2017 | Heidasch | G06F 16/36 |
| 10,878,473 | B1 * | 12/2020 | Thekkanal | G06Q 30/0641 |
| 10,943,273 | B2 * | 3/2021 | Hoffberg | G07F 17/323 |
| 11,176,325 | B2 * | 11/2021 | McAteer | G06F 16/3338 |
| 11,315,149 | B2 * | 4/2022 | Akkiraju | G06Q 50/01 |
| 11,397,759 | B1 * | 7/2022 | Park | G06F 16/2228 |

(Continued)

OTHER PUBLICATIONS

Shen, et al., LINDEN: Linking Named Entities with Knowledge Base via Semantic Knowledge Apr. 2012, 10 pages (Year: 2012).*

(Continued)

*Primary Examiner* — Noosha Arjomandi
(74) *Attorney, Agent, or Firm* — NDWE, LLP

(57) ABSTRACT

In an embodiment, the disclosed technologies include identifying a content item of a first digital data source as a candidate for linking with a target entity of a second digital data source by matching a candidate entity mentioned in the content item to the target entity in accordance with semantic similarity data computed between the candidate entity and the target entity; inputting at least one feature of the content item and at least one feature of the target entity to a set of digital models that analyze the at least one feature of the content item and the at least one feature of the target entity and determine and output qualitative data; based on the qualitative data, determining link risk data; based on the link risk data and the semantic similarity data, and determining whether to generate a link between the content item and the target entity.

20 Claims, 6 Drawing Sheets

(56) References Cited

U.S. PATENT DOCUMENTS

| | | | | |
|---|---|---|---|---|
| 11,399,029 | B2* | 7/2022 | Manna | G06F 16/13 |
| 2007/0233656 | A1* | 10/2007 | Bunescu | G06F 40/295 |
| 2016/0197902 | A1* | 7/2016 | Tunnell | H04L 9/3215 |
| | | | | 713/168 |
| 2017/0011092 | A1* | 1/2017 | Huddleston | G06F 16/2455 |
| 2019/0147376 | A1* | 5/2019 | Mahabir | G06Q 10/0635 |
| | | | | 705/7.28 |
| 2019/0278777 | A1* | 9/2019 | Malik | G06F 16/24578 |
| 2020/0387594 | A1* | 12/2020 | Sandstrom | G06F 21/36 |
| 2021/0097178 | A1* | 4/2021 | Bottaro | G06F 16/24575 |
| 2022/0156062 | A1* | 5/2022 | Kroth | G06F 8/30 |

OTHER PUBLICATIONS

Blanco, et al., "Fast and Space-Efficient Entity Linking for Queries", In Proceedings of the Eighth ACM International Conference on Web Search and Data Mining, Feb. 2, 2015, 10 Pages.

Dill, et al., "SemTag and Seeker: Bootstrapping the Semantic Web via Automated Semantic Annotation", In Proceedings of the 12th International Conference on World Wide Web, May 20, 2003, pp. 178-186.

Hachey, et al., "Graph-Based Named Entity Linking with Wikipedia", In Proceedings of the 12th International Conference on Web information System Engineering, Oct. 2011, 14 Pages.

Miller, Eric, "TAP—An Application Framework for Building the Semantic Web", Retrieved from https://www.w3.org/2002/05/tap/, Dec. 18, 2002, 2 Pages.

* cited by examiner

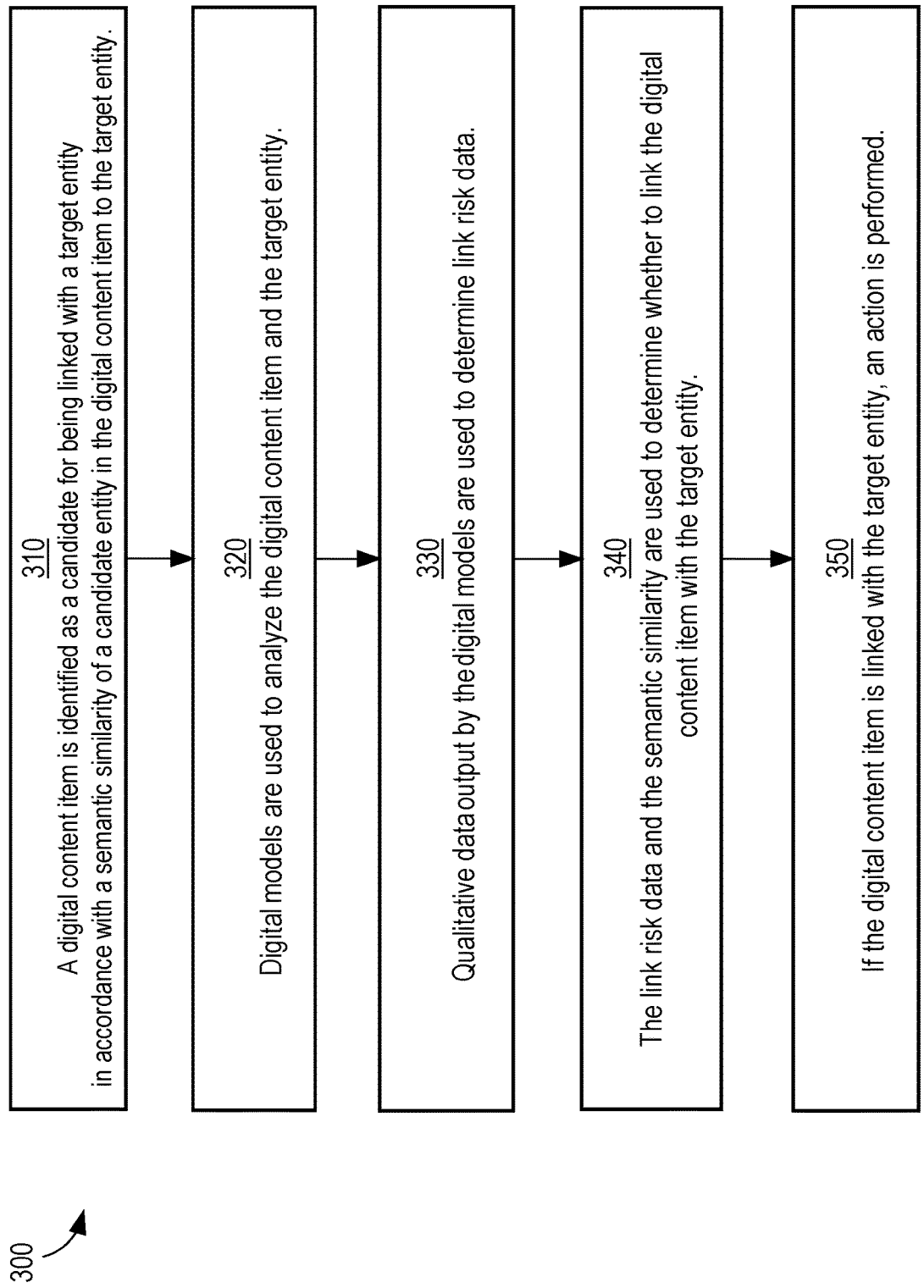

RISK-AWARE ENTITY LINKING

TECHNICAL FIELD

Technical fields to which the present disclosure relates include information retrieval and natural language processing. Other technical fields to which this disclosure relates include techniques for programming computers to match and link digital entities in multiple data sources.

BACKGROUND

In computer systems, entity resolution may refer to an automated process by which a computer determines whether the identity of an entity mentioned in the text of one data source matches the identity of an entity mentioned in the text of another data source. Entity resolution has been performed using natural language processing techniques that extract entities from data sources and determine whether they match. The data sources containing entities to be matched can be heterogenous; for example, a document and a search query, or homogenous; for example, two different documents. Entities are typically indicated by text descriptors, such as nouns alone or in combination with other parts of speech; for example, "autonomous vehicle" or "software developer."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts an example process for matching and linking entities from different data sources, which may be performed by at least one component of the system of FIG. 1, in an embodiment;

DETAILED DESCRIPTION

Figure 1:
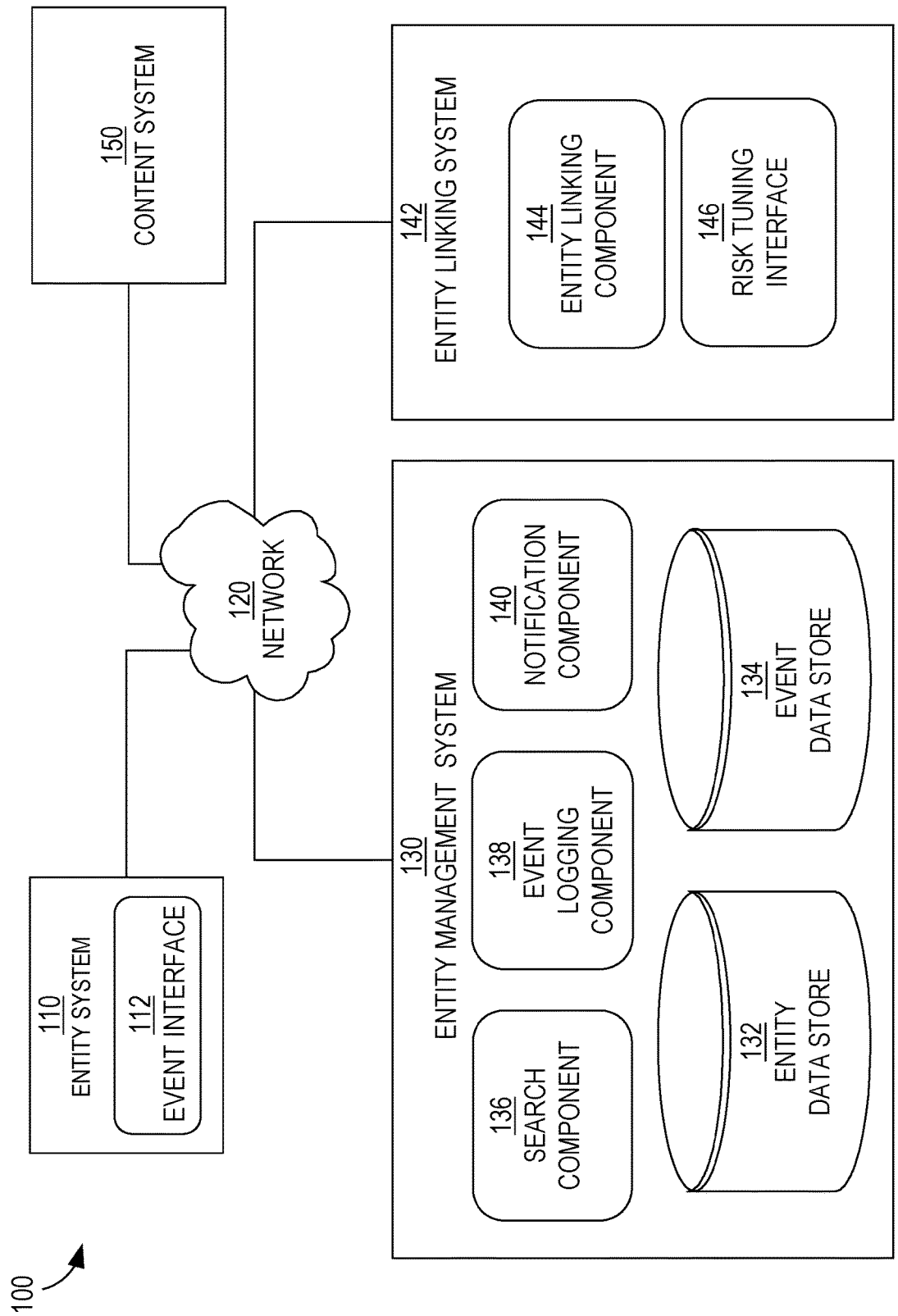
FIG. 1 is a block diagram of an example of a system that includes at least one computer capable of matching and linking entities from different data sources, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Embodiments of the disclosed technologies compute risk data and use the computed risk data in combination with semantic similarity data to determine whether to link entities from multiple digital data sources. In an embodiment, a digital content item that contains a candidate entity is identified as having a semantic similarity to a target entity. Semantic similarity may occur when, for example, a candidate entity and a target entity are of the same semantic type; that is, both the candidate entity and the target entity are references to a person, or both the candidate entity and the target entity refer to an organization. Entities are not semantically similar if they are not of the same semantic type. For example, a candidate entity that refers to a name of a product may not be semantically similar to a target entity of the same name that refers to an organization. Semantic dissimilarity can occur frequently when, for instance, a company and its flagship product have the same name; for example, LINKEDIN.

Prior to and/or after the semantic similarity analysis, digital models are used to qualitatively analyze at least one feature of a target entity and at least one feature of the digital content item that contains a candidate entity. A digital content item may "contain" a candidate entity when, for example, the digital content item includes text that refers to or mentions a candidate entity; for instance, a search of digital content items would retrieve the digital content item or find text corresponding to the candidate entity in the digital content item. Feature as used herein may refer to a feature of an entity or a feature of a content item or data source that contains an entity. Also, feature may refer to a raw feature or a computed feature. Examples of raw features include words and phrases of unstructured text, such as natural language text contained within a document, and words and phrases of structured text, such as metadata and stored data that has been obtained via input fields of an online form. Examples of computed features include sums, summaries, averages, term frequencies, and/or other computed or inferred values that are derived from raw features.

The digital models determine and output qualitative data. Examples of qualitative data include data indicative of the quality of an entity mention or a content item in which the entity mention is found, such as a likelihood that the content item containing the entity is spam or an assessment of the sentiment of the content item. Other examples of qualitative data include data indicative of the quality of an entity, such as a likelihood that the entity is or is not fake or malicious. Still other examples of qualitative data include data indicative of a relationship between a target entity and a content item in which a candidate entity is found; for example, a computed measure of the degree to which the subject matter of the content item concerns the candidate entity or a computed measure of sentiment of the content item toward the candidate entity mentioned therein.

At least one programmable rule is applied to the qualitative data to determine and output risk data. The risk data and the semantic similarity data are used to determine whether to link the digital content item with the target entity. A decision to link the digital content item with the target entity may be used, for example, to control an operation of a digital service, such as a content delivery service, a notification service, a recommendation service, a news feed service, a message service, or an alert service.

In operation, a content delivery system may send out vast quantities of notifications over a network to many user accounts, perhaps even several times a day. In some implementations, automated notifications of mentions of an entity in content items may be generated and sent to entities other than the mentioned entity, such as subscribers or followers, in which case the mentioned entity may or may not be aware of the mention or of the notification before it is sent.

Embodiments of the disclosed technologies can be employed to improve entity linking and notification operations of a content delivery system. For example, the disclosed technologies may improve the quality of entity links by filtering out low-quality or high risk entity links that are created across data sources. Reducing the number of low-quality or high risk links, in turn, may reduce the number of unnecessary, inaccurate, irrelevant, problematic, and/or unwanted notifications of content items that are produced and distributed by a content delivery system, thereby improving the performance of the content delivery system in the eyes of both the users that are the subject of such notifications and those that receive the notifications.

Additionally, where a content delivery system uses a network to distribute digital content items, reducing the volume of content items and thus the load on the content delivery system can improve a computer system by, for example, freeing up network bandwidth and/or other computing resources to perform other important tasks. As such, the disclosed technologies can improve the functioning of entity linking systems, content delivery systems and other types of digital services that utilize entity links.

As disclosed herein, certain embodiments may be particularly useful in determining whether to link proper nouns, such as named entities, that are mentioned in different data sources. The term proper noun, as used herein, may refer to a noun that identifies and is used to refer to a specific entity as opposed to a class of entities; for example, a specific place, a specific individual, a specific product, or a specific organization, such as Paris, France, Abraham Lincoln, or the United States.

However, even proper nouns often need to be disambiguated. For example, "Dublin" may refer to a city in Ireland or a city of the same name located in California or Ohio, United States. Even if an entity match is predicted to be highly accurate (i.e., an exact match), certain applications of the disclosed technologies can determine not to create a link between the matching entities if the system determines that establishing the link would create an undesirable level of risk for the entity in regard to the association with the content item that contains the matching entity. The recognition that an entity linking decision can be separated or decoupled from an entity matching process, or used to supplement the entity matching process, is an insight that has not been considered or addressed by traditional entity disambiguation techniques, but is addressed by various aspects of this disclosure.

System Overview

FIG. 1 is a block diagram of an example system 100 for matching and linking entities in different data sources, in an embodiment. System 100 includes an entity system 110, a network 120, an entity management system 130, an entity linking system 142, and a content system 150. Entity system 110 is configured to communicate bidirectionally with at least entity management system 130 over network 120. Entity management system 130 is configured to communicate bidirectionally with at least entity linking system 142 over network 120. Entity linking system 142 is configured to communicate bidirectionally with at least content system 150 and entity management system 130 over network 120.

System 100 or any of its component systems 110, 150, 130, 142 may include any number of client computers and/or server computers that interact with each other over network 120. For example, system 100 or any of its component systems 110, 150, 130, 142 may comprise multiple computing elements and devices that may be connected in a local network or distributed regionally or globally across many networks via the Internet. Although depicted in FIG. 1 as individual systems, all or portions of entity system 110, entity management system 130, entity linking system 142 and/or content system 150 may be part of the same overall system and may be provided or owned or managed by the same entity.

Portions of system 100 may be implemented as a web application. For example, a portion of system 100 may operate in entity management system 130 or entity linking system 142 and another portion may operate in a web browser executing on a client device such as an entity system 110. In such embodiment, the web browser transmits a HTTP request over a network (e.g., the Internet) in response to user input (e.g., entering of text and selection of a graphical button) that is received through a user interface provided by the web application and displayed through the web browser. Entity management system 130 or entity linking system 142 receives the input, performs one or more operations, and returns one or more results to the client device in an HTTP response that the web browser receives and processes. Alternatively, a client-side application is installed and executes on a client device and is configured to communicate with entity management system 130 and/or entity linking system 142 over a network.

Entity system 110 interacts with entity management system 130; for example, by communicating events, data and/or instructions to entity management system 130 and/or obtaining data and/or instructions from entity management system 130. Entity system 110 includes an event interface 112. Event interface 112 may be implemented as a user interface operable by one or more end users of entity management system 130 and/or as an application program interface (API) through which other components and/or systems may interact with entity management system 130. For example, event interface 112 may facilitate events such as viewing and manipulating entity data stored in entity data store 132.

Content system 150 includes a searchable store of digital content, which may be updated to include new items of content from time to time. Content system 150 may include online and/or offline data sources, and may include a set of web sites on the Internet; for example, web sites that publish news articles, blogs, comments, tweets, and reviews. Content system 150 may include, for example, web pages, social media pages, posts, and/or news feeds. Digital content within content system 150 can be searched and retrieved by, for example, an Internet search engine or a web crawler.

As used herein, an example of a system is an application or a computing device or a combination of electronic devices or a combination of at least one application and at least one device. Examples of computing devices and electronic devices include server computers, laptop computers, tablet computers, smartphones, desktop computers, personal digital assistants (PDAs), wearable electronic devices, and smart appliances.

An example of an application is a native application that is installed on a particular type of computing device or configured to operate with a particular operating system. Another example of an application is a client application that is downloaded from a server computer and executes within web browser software running on a computing device.

Another example of an application is a server application that runs on a server computer or on a network of server computers. An application may be implemented in hardware, software, or a combination of hardware and software. An application may include a data store or may be communicatively coupled to a data store. Thus, a system may include a combination of an application and a data store. As used herein, the term data store may refer to a logical data structure, such as a searchable database, an index, a table, a tree, or an electronic file. Although the various systems, data stores, components and devices are depicted in the figures and described as including certain features, all embodiments are not limited to requiring these features and some embodiments may include additional features not described herein. Further, the particular arrangement of systems, components, data stores, and devices shown in the drawings represents one example of an implementation. It will be understood that items shown as separate components, devices, systems, or data stores may be combined together in other implementations and that individual items may be further broken down into smaller elements or subsets of functionality in other implementations.

Network 120 may be implemented on any medium or mechanism that provides for the exchange of data, signals, and/or instructions between component systems 110, 150, 130, 140 of system 100. Examples of network 120 include, without limitation, a Local Area Network (LAN), a Wide Area Network (WAN), an Ethernet network or the Internet, or one or more terrestrial, satellite or wireless links, or a combination of any number of different networks and/or communication links.

Entity Management System

In the embodiment of FIG. 1, entity management system 130 includes an entity data store 132, an event data store 134, a search component 136, an event logging component 138, and a notification component 140. Although not specifically shown in FIG. 1, it will be understood that entity data store 132, event data store 134, search component 136, event logging component 138, and notification component 140 are bidirectionally communicatively coupled as needed to perform the functionality of entity management system 130. Examples of components are applications, computer program modules, and code libraries. Examples of communicative coupling mechanisms include inter-process communication (IPC) interfaces and application program interfaces (APIs).

Entity data store 132 and event data store 134 each may reside on one or more persistent and/or volatile storage devices that may reside within the same local network as entity management system 130 and/or in a network that is remote relative to entity management system 130. Thus, although depicted as being included in entity management system 130, each data store 132, 134 may be part of entity management system 130 or accessed by entity management system 130 over a network, such as network 120. Entity data store 132 stores data relating to entities, including entity identifiers. Event data store 134 stores data relating to events detected by event logging component 138, described below, as having been taken by a user in entity management system 130; for example, login activity data or search history data.

Search component 136 includes an interface to allow users and/or automatic processes to initiate searches of entity data store 132 and receive results of those searches. Thus, search component 136 may provide a user interface to allow users of entity system 110 to search entity data store 132 and/or provide an API to allow executing programs or processes of entity linking system 142 to issue queries that search component 136 processes against data stored in entity data store 132. For example, entity linking system 142 may utilize search component 136 to search entity data store 132 to identify a target entity, as described in more detail below. Alternatively or in addition, entity linking system 142 may use search component 136 to search event data store 134; for example, to retrieve event data relating to a target entity, or to interface with content system 150 to identify content items that contain candidate entities.

Event logging component 138 logs data relating to events that occur within entity management system 130 while in operation; for example, logins, searches, and user actions relating to digital content made available to a user of entity management system 130 via notification component 140, such as views, likes, comments, and shares of digital content. Event logging component 138 stores event data relating to logged events in event data store 134. Event logging performed by event logging component 138 may be subject to user consent as required by any applicable laws, rules or regulations.

Notification component 140 generates and delivers electronic notifications to user accounts of users of entity management system 130. Examples of electronic notifications include synchronous or asynchronous messages, alerts, news feeds, recommendations, and deliveries of digital content items. An electronic communication can include an item of digital content, for example as an attachment, or may contain an actionable link, such as a hyperlink, that can be traversed to view or download digital content referenced in the notification.

Operation of notification component 140 may be triggered by output of entity linking system 142. For example, entity linking system 142 may generate a signal indicating that an item of digital content of content system 150 can be linked with a target entity stored in entity data store 132. Notification component 140 may act on this signal by generating an electronic notification that associates the item of digital content with the target entity and sending the notification to one or more user accounts; for example, user accounts that 'follow' the target entity within entity management system 130.

In an embodiment, entity management system 130 is implemented as or includes a content delivery service that is supported by a connection network. Examples of connection networks include social networks, professional connection networks, and other applications that store data pertaining to entities and indicate relationships or 'connections' between and among entities. In this context, entity data store 132 stores entity data records that include profile data and connection data associated with individual entities. An entity may be a person, an organization (e.g., a company, a charity, a non-profit organization, a government agency, an alumni group, etc.), a group of people, or an association.

Profile data for a person may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user. Profile data can also include derived or computed data that, with the user's consent as may be required by applicable laws, rules, or regulations, is collected and stored based on actions that the user has taken within entity management system 130.

Profile data of an organization, such as a company, may include a company name, an address of the company, a number of employees, a listing of principals or chief executives of the company, a description of any current job openings, and a description of products or services provided by the organization. Connection data for an entity may include an entity identifier of another entity and a date/timestamp indicating the date and time that a connection with the other entity was made.

A user of entity management system 130 may correspond to one or more entities that are stored in entity data store 132. For example, a single user may create multiple different entities within entity management system 130, each with a same or similar name or title but targeted to a different purpose, interest, or audience. Alternatively or in addition, a representative of an organization may create an entity within entity management system 130 that represents the organization and has an associated profile so that other users can learn about the organization, follow the organization, and/or subscribe to messages and notifications issued by and/or about the organization.

Examples of events that include actions that may be taken by a user, for example via a user account registered within entity management system 130, include posting content, viewing content posted by other users, viewing entity profile pages, exchanging messages with other users, commenting on content posted by other users and following entities. Entity management system 130 may prompt users to perform actions via notification component 140. For example, notification component 140 may include a push notification service that causes periodic displays of content or content-related notifications such as "Mentioned in the News," "People You May Know," or "Jobs You May be Interested In." The notifications generated by notification component 140 may be targeted to particular users or groups of users. For instance, notifications that relate to a particular target entity may be provided only to the user accounts of users who have indicated within entity management system 130 that they would like to follow the target entity.

Entity Linking System

In the embodiment of FIG. 1, entity linking system 142 includes an entity linking component 144 and a risk tuning interface 146. Although not specifically shown in FIG. 1, it will be understood that entity linking component 144 and risk tuning interface 146 are bidirectionally communicatively coupled as needed to perform the functionality of entity linking system 142. As described in more detail below, entity linking component 144 when executed by one or more processors performs risk-aware entity linking as disclosed herein.

Risk tuning interface 146 receives or obtains risk tuning data. Risk tuning interface 146 may include a user interface that can be controlled by an input device to receive user-supplied risk tuning data. Alternatively or in addition, risk tuning interface 146 may include an API or similar mechanism by which risk tuning data may be received from or delivered to another executing program or process. Examples of risk tuning data include parameter values that indicate acceptable levels of risk with respect to one or more risk criteria used by entity linking component 144 to evaluate link risk. Risk tuning data may be expressed as a numerical value or range of values that indicate varying degrees of risk, or as a text label such as "high," "medium," or "low," for example. Risk tuning data may include a parameter that has a value of 0 or 1, with 0 indicating low risk and 1 indicating high risk or vice versa, or may include a range of values between 0 and 1, in another example.

Figure 2:
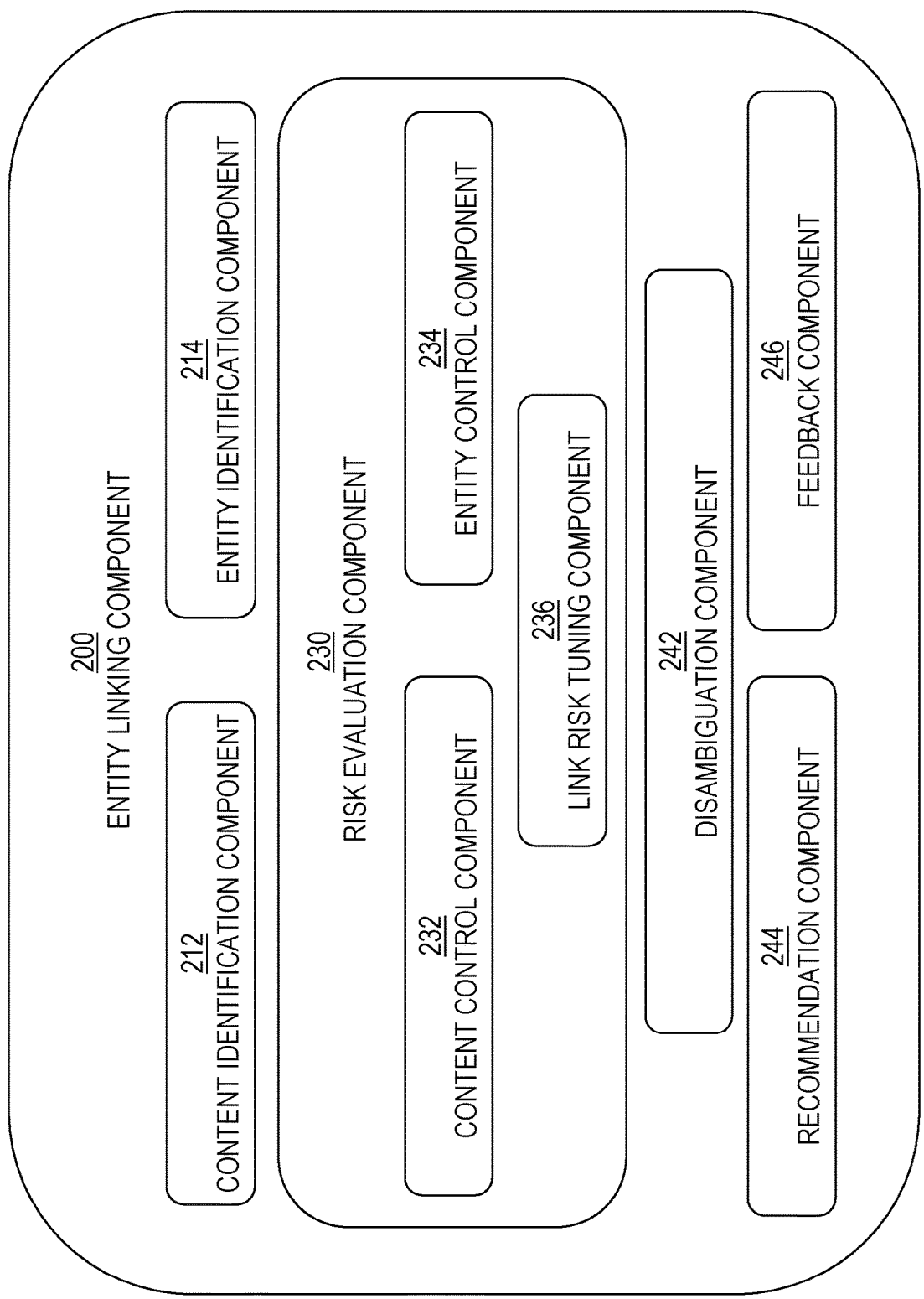
FIG. 2 is a block diagram that depicts an entity linking component, which may be part of the system of FIG. 1, in an embodiment.

An embodiment of entity linking component 144 is shown in FIG. 2. FIG. 2 is a block diagram that depicts entity linking component 200, which corresponds to entity linking component 144 of entity linking system 142 of FIG. 1, in an embodiment. Entity linking component 200 includes a content identification component 212, an entity identification component 214, a risk evaluation component 230, a disambiguation component 242, a recommendation component 244, and a feedback component 246, in an embodiment. Although not specifically shown in FIG. 2, it will be understood that content identification component 212, entity identification component 214, risk evaluation component 230, and disambiguation component 242 are bidirectionally communicatively coupled as needed to perform the functionality of entity linking component 200.

Content identification component 212 identifies digital content items that contain candidate entities that may be linked with target entities of entity management system 130. Content identification component 212 may include an autonomous or semi-autonomous search process, such as a web crawler and/or an RSS feed. Alternatively or in addition, content identification component 212 may include a user-controlled content identification interface, such as a search or navigation interface to a database or file system.

Digital content items identified by content identification component 212 may reside on a network and/or on a local device. In an embodiment, content identification component 212 is programmed to search portions of the Internet or another digital data source for content that contains proper nouns; for example, named entities such as persons, locations, organizations, or products. Content identification component 212 may be implemented as an offline component that runs periodically, where each run produces a set of content items that contain named entities that may be evaluated for matching against target entities of entity management system 130.

Entity identification component 214 identifies target entities in entity management system 130. A target entity as used herein may refer to an entity for which linkable content items may be sought. For example, a target entity may be an entity that is connected with, followed or subscribed to by one or more users of entity management system 130. Conversely, if an entity does not have any connections, followers or subscribers, it may not be identified by entity identification component 214 as a target entity. Entity identification component 214 may include an autonomous or semi-autonomous search process, such as a parameterized search query. Entity identification component 214 may be implemented as an offline component that runs periodically, where each run produces a set of target entities.

Risk evaluation component 230 evaluates various risk factors that may be associated with a particular target entity and/or a particular content item that contains a candidate entity. The embodiment of risk evaluation component 230 shown in FIG. 2 includes a content control component 232, an entity control component 234, and a link risk tuning component 236, in an embodiment. Although not specifically shown in FIG. 2, it will be understood that content control component 232, entity control component 234, and link risk tuning component 236 are bidirectionally communicatively coupled as needed to perform the functionality of risk evaluation component 230.

As described in more detail below with reference to FIG. 4A and FIG. 4B, content control component 232 performs at least one type of risk analysis on content items containing candidate entities and outputs content-related risk data; while entity control component 234 performs at least one type of risk analysis on target entities and outputs entity-related risk data. Link risk tuning component 236 includes a set of programmable rules that can be tuned to adjust the relative importance of the content-related risk data vis a vis the entity-related risk data in the context of a particular entity linking application. For example, link risk tuning component 236 may allow multipliers or weighting values associated with particular content-related risk criteria and entity-related risk criteria, respectively, to be specified and increased or decreased, so that risk scores output by content control component 232 and entity control component 234 may reflect the relative importance of content-related risk factors and entity related risk factors, respectively, to a particular implementation of system 100.

Disambiguation component 242 ingests content items identified by content identification component 212 and entities identified by entity identification component 214. In some embodiments, content items identified by content identification component 212 are processed by content control component 232 prior to ingestion of the content items by disambiguation component 242. For example, content control component 232 may filter the output of content identification component 212 and provide a filtered set of content items along with a set of content risk scores to disambiguation component 242.

Disambiguation component 242 operates using one or more entity resolution techniques to create content item/entity pairs containing likely matches of candidate entities of content items with target entities of entity management system 130. For example, disambiguation component 242 determines whether a candidate entity of "Jeff Weiner" mentioned in a content item is likely referring to the same person as a target entity of "Jeff Weiner" within entity management system 130. Examples of approaches that can be used by disambiguation component 242 include various methods of computing semantic similarity, including but not limited to: graph-based approaches that link entity mentions to canonical entities mentioned in a publicly searchable knowledge base, and cosine similarity-based approaches that use a TF-IDF (term frequency-inverse document frequency) representation to link mentions to entities in a knowledge base.

In one approach, features of text that are adjacent to a mention of a candidate entity in a content item are compared to features of the target entity; for example, features of the target entity's profile data are compared to features of the text surrounding the candidate entity mention in the content item. For instance, if the content item mentions "Jeff Weiner" and also mentions "LinkedIn" within the same sentence or an adjacent sentence and a target entity of "Jeff Weiner" lists "LinkedIn" as the company name in the target entity's profile data, disambiguation component 242 may consider the candidate entity and the target entity to be highly semantically similar.

As another example, suppose a content item mentions "Limon" and the surrounding text talks about the company's stock price but provides no other details about the company. Further suppose that there are two different entities in entity management system 130 that have a company name of "Limon," where the first Limon profile data indicates that its industry is Design, that it has 547 followers and 187 employees, and the second Limon profile data indicates that it is a Financial Services company with 50 followers and 1 employee. In this example, disambiguation component 242 may include the follower count and/or employee count in the semantic similarity analysis and conclude that the company with the larger number of employees and followers is more likely to be publicly owned and therefore more likely to match the candidate entity of Lemon found in the content item. Disambiguation component 242 outputs a set of content item/entity pairs along with data that indicates the degree to which the target entity and the candidate entity appear to be semantically similar; for example, a probabilistic confidence value between 0 and 1.

Similar to other known entity disambiguation techniques, disambiguation component 242 may be configured for high precision to minimize the risk of incorrect entity associations. However, as disclosed herein, even if a match of two entities is highly precise, linking the entities might still be undesirable. Various aspects of risk evaluation component 230 provide risk data that may be used by disambiguation component 242 or in addition to the output of disambiguation component 242 in determining whether to create a link between a target entity and a content item containing a candidate entity.

Recommendation component 244 determines whether to generate link recommendation data, which may be used by notification component 140 of FIG. 1 to determine whether to generate and send notifications of an entity-content item link to one or more users of entity management system 130. To do this, recommendation component 244 cooperates with risk evaluation component 230 and with disambiguation component 242 to receive and evaluate output provided by both of components 242, 244. Output of recommendation component 244 may include a binary indicator such as 1 or Y to recommend a link and 0 or N to not recommend a link.

For instance, if the output of risk evaluation component 230 is a set of risk scores and the output of disambiguation component 242 is a confidence value indicative of the likelihood that two entities match semantically, recommendation component 244 may compare each risk score and confidence value to a corresponding threshold value and determine to recommend that the matching entities be linked only if all risk scores and the confidence value exceed the corresponding threshold values. In another example, recommendation component 244 may apply programmable weightings to the risk scores and/or confidence value and compare the weighted risk scores and confidence value to the corresponding thresholds. In yet another example, recommendation component 244 may generate a composite score such as a sum or weighted average of all risk scores and compare the composite score to a threshold risk value.

In this way, recommendation component 244 is configurable according to the needs of different content delivery applications and/or other digital services. For some applications, accuracy may be more important than risk such that as long as accuracy is high, recommendation component 244 will recommend establishing a link between entities. For other applications, risk may be very important such that no link recommendation will be made if the risk score is high, irrespective of whether a confidence value associated with the semantic similarity of the links is also high. Thus, whereas link risk tuning component 236, described above, enables tuning or balancing of content-related risk data versus entity-related risk data, recommendation component 244 contains similar mechanisms for tuning or balancing risk data versus disambiguation accuracy or semantic similarity data. Criteria used by recommendation component 244 and/or link risk tuning component 236 can be supplied and/or modified via risk tuning interface 146, discussed above.

Feedback component 246 processes explicit and/or implicit inputs received by entity management system 130 once a link recommendation has been made that results in generation of an electronic notification or other system action. Feedback component 246 tracks wrong mentions; that is, errors made by disambiguation component 242, to determine how well disambiguation component 242 is working. Feedback component 246 also tracks viral signals; that is, indications of user responses to links that were made, to determine how well risk evaluation component 230 is working. To do this, feedback component 246 may search event data store 134 for various types of signals, such as likes and shares, and indications of wrong mentions.

In response to detecting signals that indicate a wrong mention, feedback component 246 may communicate with entity linking system 142 to incorporate the signals into a learned model of disambiguation component 242. Similarly, in response to detecting viral signals of positive responses, feedback component 246 may communicate with entity linking system 142 to adjust a programmable rule of link risk tuning component 236 and/or recommendation component 244 so that entity linking system 142 generates more links of the type that generated the positive viral response. On the other hand, in response to detecting viral signals of negative responses or lack of viral responses, feedback component 246 may communicate with entity linking system 142 to adjust a programmable rule of link risk tuning component 236 and/or recommendation component 244 so that entity linking system 142 does not generate any more links of the type that generated the negative or non-viral response.

Overview of Entity Linking Process

FIG. 3 is a flow diagram that depicts an example process 300 for matching and linking entities from different data sources, in an embodiment. Process 300 may be implemented by at least one computing device; for example, one or more different components of system 100, such as one or more components of entity linking system 142 alone or in combination with one or more components of entity management system 130, content system 150 and/or entity system 110. For ease of discussion, process 300 is illustrated and described using a number of functional blocks. It will be understood, however, that this disclosure is not limited to the particular arrangement and description of the functional blocks of process 300. In addition, it will be understood that the functional blocks of process 300 can include functionality that is described elsewhere in this disclosure; for example, functionality described as being performed by system 100 or one or more of the systems or components of system 100.

At block 310, a content item of a first digital data source is identified by process 300 as a candidate for being linked with a target entity of a second digital data source in accordance with a semantic similarity of a candidate entity in the digital content item to the target entity. In an embodiment, identifying the digital content item includes matching the candidate entity in the content item to the target entity in accordance with semantic similarity data that is computed between the candidate entity and the target entity. Examples of digital data sources include content system 150, entity data store 132, and/or entity system 110. Additional examples of digital data sources include documents and data records; for example, documents found in content system 150 and entity profiles found in entity data store 132 may be considered digital data sources because they are potential sources of candidate entities and target entities, respectively.

At block 320, digital models are used by process 300 to analyze features of the digital content item and features of the target entity identified in block 310. In an embodiment, at least one feature of the content item and at least one feature of the target entity are input to a set of digital models that analyze the at least one feature of the content item and the at least one feature of the target entity and determine and output qualitative data. In some cases, features of the content item and features of the target entity are analyzed separately by different models. In other instances, one or more models analyze some features of the content item in conjunction with some features of the target entity. Examples of digital models include category scoring model 412, content sentiment scoring model 414, visibility scoring model 452, aboutness scoring model 454, entity sentiment scoring model 456, each of which is described below with reference to FIG. 4A or FIG. 4B, as the case may be.

In an embodiment, a first model of the set of digital models is used by process 300 to perform a sentiment analysis on the at least one feature of the content item to determine and output a sentiment score as part of the qualitative data. An example of the first model is content sentiment scoring model 414, described below. In an embodiment, a second model of the set of digital models is used by process 300 to perform a topic analysis on the at least one feature of the content item to determine and output a topic descriptor associated with the content item as part of the qualitative data. An example of the second model is a topic scoring system of content sentiment scoring model 414, described below.

In an embodiment, a third model of the set of digital models is used by process 300 to perform a categorical, for example, malware, analysis on the at least one feature of the content item and the at least one feature of the target entity to produce output that is used as part of the qualitative data. An example of the third model is category scoring model 412, described below.

In an embodiment, a quantitative analysis of engagement data associated with the target entity is performed by process 300 and output of the quantitative analysis is provided to block 330. Visibility scoring model 452, described below, may be used to perform the quantitative analysis of engagement data.

In an embodiment, a fourth model of the set of digital models is used by process 300 to analyze a position feature of the candidate entity within the content item and a frequency of occurrence feature of the candidate entity within the content item to determine and output an aboutness score that is used as part of the qualitative data. An example of the fourth scoring model is aboutness scoring model 454, described below.

In an embodiment, a fifth model of the set of digital models is used by process 300 to analyze a sentiment feature of the content item relative to the candidate entity to determine and output an entity sentiment score that is used as part of the qualitative data, where the entity sentiment score associates a sentiment with the candidate entity. An example of the fifth model is entity sentiment scoring model 456, described below.

In various embodiments, all or any combination or subset of the described models may be used by process 300 to analyze features of the content item and features of the target entity to determine link risk data. As disclosed herein, one or more of tuning components 236, 422, 458 may be used to adjust weighting parameters or thresholds that are associated with the various models to thereby adjust the relative importance of individual models in determining the link risk data.

At block 330, qualitative data output by the digital models of block 320 are used by process 300 to determine link risk data. To do this, in an embodiment, at least one programmable rule is applied to the qualitative data to determine the link risk data. In an embodiment, the at least one programmable rule is applied to the sentiment score produced by block 320 to determine the link risk data. In an embodiment, the at least one programmable rule is applied to the topic descriptor produced by block 320 and the sentiment score produced by block 320 to determine the link risk data. In an embodiment, at least one programmable rule is applied to output of the malware analysis of block 320 to determine the link risk data. In an embodiment, at least one programmable rule is applied to output of the quantitative analysis of block 320 to determine the link risk data. In an embodiment, at least one programmable rule is applied to the aboutness score produced by block 320 to determine the link risk data. In an embodiment, at least one programmable rule is applied to the entity sentiment score produced by block 320 to determine the link risk data.

In block 330, a set of programmable rules is used by process 300 to evaluate various aspects of the qualitative data produced by block 320 individually or collectively in order to determine the link risk data. Any individual rule of the set of programmable rules may be adjusted by varying a rule parameter such as a weighting value or multiplier, or a threshold that is used to determine whether link risk is high, medium or low based on the qualitative data.

In an embodiment, a first set of set of digital models is used by process 300 to analyze at least one feature of the content item to determine and output at least one content score in block 320, a second set of set of digital models is used to analyze at least one feature of the target entity to determine and output at least one entity score in block 320, and in block 330, the at least one content score and the at least one entity score are combined to determine the link risk data. For example, in an embodiment, a programmable rule includes weighting values that can be adjusted in order to adjust the relative importance to the link risk data determination of the at least one content score as compared to the importance to the link risk data of the at least one entity score.

At block 340, the link risk data of block 330 and the semantic similarity data of block 310 are used by process 300 to determine whether to link the digital content item with the target entity. In an embodiment, the link risk data and the semantic similarity data are output to, in block 350, control an operation of a content delivery service relating to the content item and the target entity. At block 350, if the digital content item is linked with the target entity, an event, such as a content delivery action, is initiated by a content delivery service. For example, a notification that refers to the digital content item and the target entity may be generated.

In an embodiment, process 300 includes tuning at least one threshold used to determine the link risk data; for example, in response to an input from a user of a software application that is operatively coupled to the second digital data source of block 310. In response to using the tuned at least one threshold to determine to link content item with the target entity, operation 350 may cause an event to be performed by system 100, such as inclusion of at least a portion of the content item in a digital notification that is transmitted to a user of a software application that is operatively coupled to the second digital data source of block 310.

In response to delivery of the digital notification, process 300 may include determining and analyzing engagement data indicative of user engagement with the digital notification; and using the engagement data to tune the at least one threshold that is used to determine the link risk data. Examples of engagement data include data indicative of whether the recipient viewed, opened, liked, saved, or forwarded the notification. Another example of engagement data is affinity data; for example, the similarity of entity profile data; such as whether location, company name, location, or title of two entities match, number of common connections; existence of a first-degree connection, etc.

Content Control Component

Figure 4A:
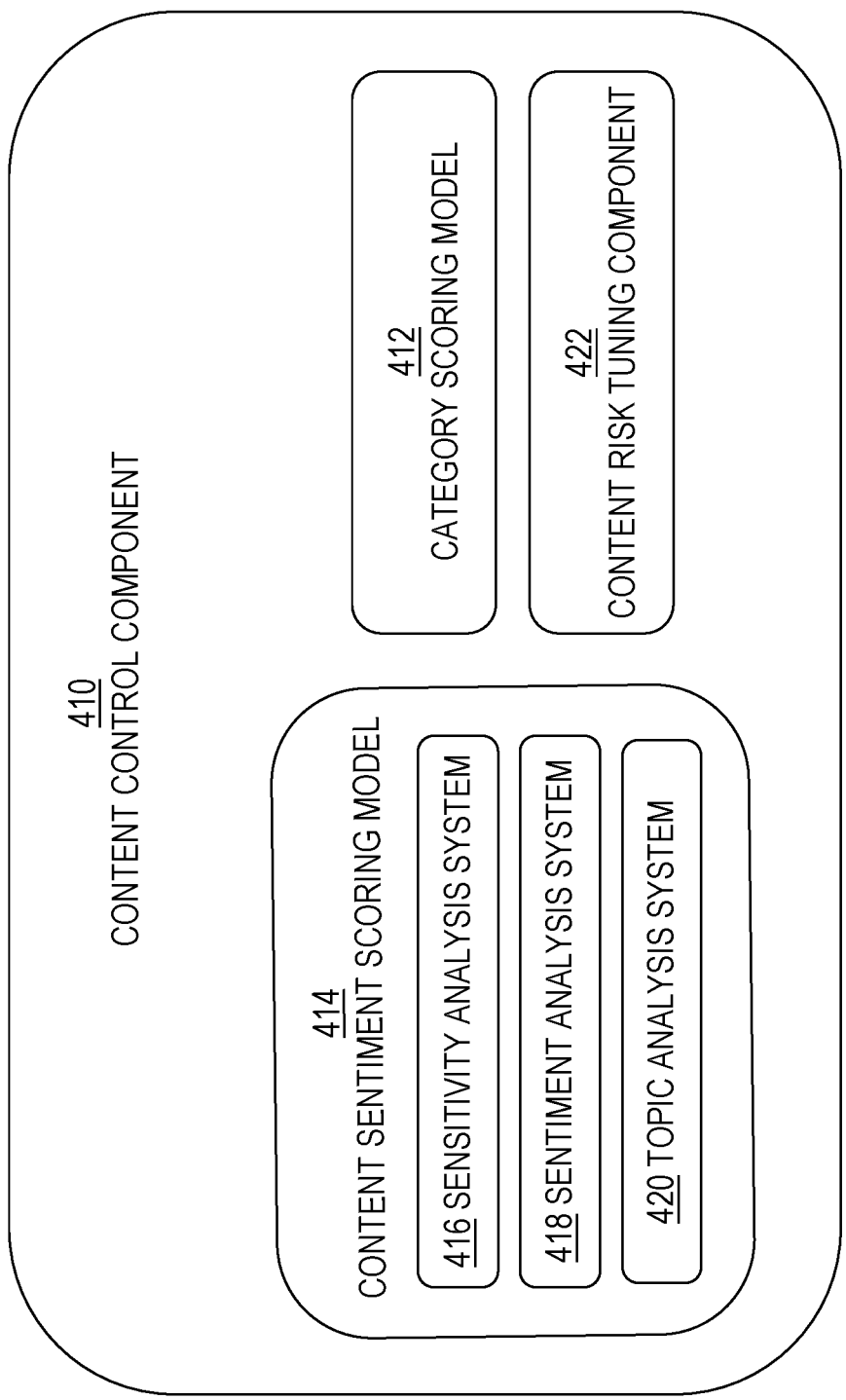
FIG. 4A is a block diagram that depicts a content control component, which may be part of the entity linking component of FIG. 2, in an embodiment.

An embodiment of content control component 232 is shown in FIG. 4A. FIG. 4A is a block diagram that depicts content control component 410, which corresponds to content control component 232 of risk evaluation component 230 of FIG. 2, in an embodiment. Content control component 410 includes a category scoring model 412, a content sentiment scoring model 414 and a content risk tuning component 422, in an embodiment. Although not specifically shown in FIG. 4A, it will be understood that category scoring model 412, content sentiment scoring model 414, and content risk tuning component 422 are bidirectionally communicatively coupled as needed to perform the functionality of content control component 410.

Content control component 232 synthesizes output of models 412, 414 to determine and output a content-related risk score that can be used by risk evaluation component 230 in combination with output of entity control component 234 to determine an overall link risk score. In some embodiments, content control component 232 operates prior to disambiguation component 242 to pre-filter content items prior to entity disambiguation. In other embodiments, content control component 232 operates on the output of disambiguation component 242 to filter entity-content item pairs prior to operation of recommendation component 244.

Category scoring model 412 is, in an embodiment, a set of spam and/or content quality filters that classify content items that have been identified by content identification component 212 into high or low-quality categories, and output one or more category risk scores for each content item. In an embodiment, category scoring model 412 is implemented as a collection of neural network-based classifiers that are trained on positive and negative training examples, for instance, samples of content that have been manually labeled as spam or not spam, by a supervised learning process. In response to input of features of a content item, category scoring model 412 returns category risk scores such as a series of probability values, where each probability value indicates a likelihood that the content item falls into a particular content category, i.e., 'spam.'

For example, a content item that contains a long list of names of famous people, perhaps preceded by hashtags, may be classified as spam by category scoring model 412 even though the content item contains named entities that might match target entities of entity management system 130, because of a low perceived value of linking such an item to a target entity. As such, content risk tuning component 422 might weight the output of category scoring model 412 highly so that if the output of category scoring model 412 indicates that a content item has a high likelihood of being spam, the overall content risk score is also high, thereby increasing the likelihood of a negative link decision and avoiding a low-quality entity link and subsequent system action.

In some embodiments, aspects of content control component 410 may be arranged in a sequential processing pipeline so that portions of content control component 410 are executed prior to or after either or both of entity control component 234 and/or disambiguation component 242. For example, the analysis performed by category scoring model 412 may be run as a preliminary step prior to entity disambiguation in order to avoid running disambiguation component 242 on low-quality content items. This in turn can improve the quality of the output of disambiguation component 242 and improve the efficiency of the overall entity linking component 200.

Content sentiment scoring model 414 performs sentiment analysis on content items identified by content identification component 212 and outputs a content sentiment risk score for each content item. As used herein, sentiment analysis may refer to a process by which a computer computationally determines whether a particular content item contains subject matter that is likely to evoke a strong positive or negative reaction in the reader of the content item. To do this, in an embodiment, content sentiment scoring model 414 includes a combination of one or more of: a rule-based sensitivity analysis system 416 that is programmed to identify highly sensitive content items based on historical knowledge of the types of content items that tend to be highly sensitive and output a sensitivity risk score for each content item; a machine learning-based sentiment analysis system 418 that classifies a given content item into one of a set of sentiment categories and outputs a sentiment risk score; for example, strongly negative, negative, neutral, positive, strongly positive; and/or a machine learning-based topic analysis system 420 420 that identifies a topic to which the subject matter of the content item relates and outputs a topic identifier and/or risk score.

In an embodiment, the sensitivity analysis system 416 of content sentiment scoring model 414 includes a set of rules that use regular expressions to look for patterns or sequences of text and use a set of keywords, such as a list or a graph, tree or ontology, to look for keywords, in content items identified by content identification component 212. An example of a regular expression is a parameterized pattern of text characters used to capture alternative spellings, misspellings, and alternative forms and tenses of particularly sensitive keywords or phrases, such as "murder." Thus, in implementations of system 100 in which there is a preference not to link target entities with corresponding entity mentions in content items that include highly sensitive content, the output of sensitivity analysis system 416 can be weighted highly via content risk tuning component 422, or a corresponding threshold can be adjusted by content risk tuning component 422, in order to filter out highly sensitive content either prior to or after entity matching by disambiguation component 242 or prior to or after entity linking by entity linking component 200.

In an embodiment, the sentiment analysis system 418 includes one or more classifiers that have been trained by applying a supervised learning process to positive and negative examples of natural language text that evidence each of the desired sentiment categories. For example, a particular implementation of system 100 may have a preference to filter out content items that evidence a strong negative opinion. In this case, the topic analysis classifier(s) would be trained to recognize content items that contain keywords or phrases that evidence a strong negative opinion, such as "hate." Thus, in implementations of system 100 in which there is a preference not to link target entities with corresponding entity mentions in content items that have a strong opinion, the output of sentiment analysis system 418 can be weighted highly via content risk tuning component 422, or a corresponding threshold can be adjusted by content risk tuning component 422, in order to filter out content items associated with strong opinions either prior to or after entity matching by disambiguation component 242 or prior to or after entity linking by entity linking component 200.

Similarly, in an embodiment, topic analysis system 420 includes one or more classifiers that have been trained by applying a supervised learning process to positive and negative examples of natural language text that evidence each of the desired topics and outputs topic identifiers and/or risk scores for each content item. For example, a particular implementation of system 100 may have a preference to filter out content items that relate to certain sensitive topics, such as personal medical issues or politics. In this case, the topic analysis classifier(s) can be trained to recognize content items that are associated with the identified sensitive topics. Thus, in implementations of system 100 in which there is a preference not to link target entities with corresponding entity mentions in content items that relate to highly sensitive topics, the output of topic analysis system 420 can be weighted highly via content risk tuning component 422, or a corresponding threshold can be adjusted by content risk tuning component 422, in order to filter out content items associated with sensitive topics, either prior to or after entity matching by disambiguation component 242 or prior to or after entity linking by entity linking component 200.

In some embodiments, the output of two or more of sensitivity analysis system 416, sentiment analysis system 418, and topic analysis system 420 may be analyzed in combination to produce an aggregate content sentiment risk score that is output by content sentiment scoring model 414. For example, some implementations of system 100 may have a preference to filter out content items that have a strong sentiment toward a particular topic. In this case, the output of both the sentiment analysis system 418 and the topic analysis system 420 are analyzed, such that, for instance, if a content item has a strong sentiment but is not related to a topic of concern, it may remain eligible for entity linking and not be filtered out, but, on the other hand, if a content item does not have a strong sentiment but is related to a topic of concern, then the content item may be filtered out and not eligible for entity linking.

Content risk tuning component 422 includes a set of programmable rules that can be tuned to adjust the relative importance of the various forms of content-related risk analyses in the context of a particular entity linking application. For example, content risk tuning component 422 may allow multipliers or weighting values or thresholds associated with particular content-related risk criteria to be specified and increased or decreased, so that output of category scoring model 412 and the outputs of the various systems of content sentiment scoring model 414, i.e., sensitivity analysis system 416, sentiment analysis system 418, and topic analysis system 420, are appropriately weighted relative to one another to appropriately reflect the relative importance of each of the various systems and models 412, 414 to the overall content risk score.

In addition to content risk tuning component 422, some embodiments of content sentiment scoring model 414 include an additional tuning component by which weighting values and/or other parameter values associated with the output of each of sensitivity analysis system 416, sentiment analysis system 418, and topic analysis system 420 can be adjusted according to the relative importance of the systems 416, 418, 420 to the needs of a particular implementation of system 100.

Entity Control Component

Figure 4B:
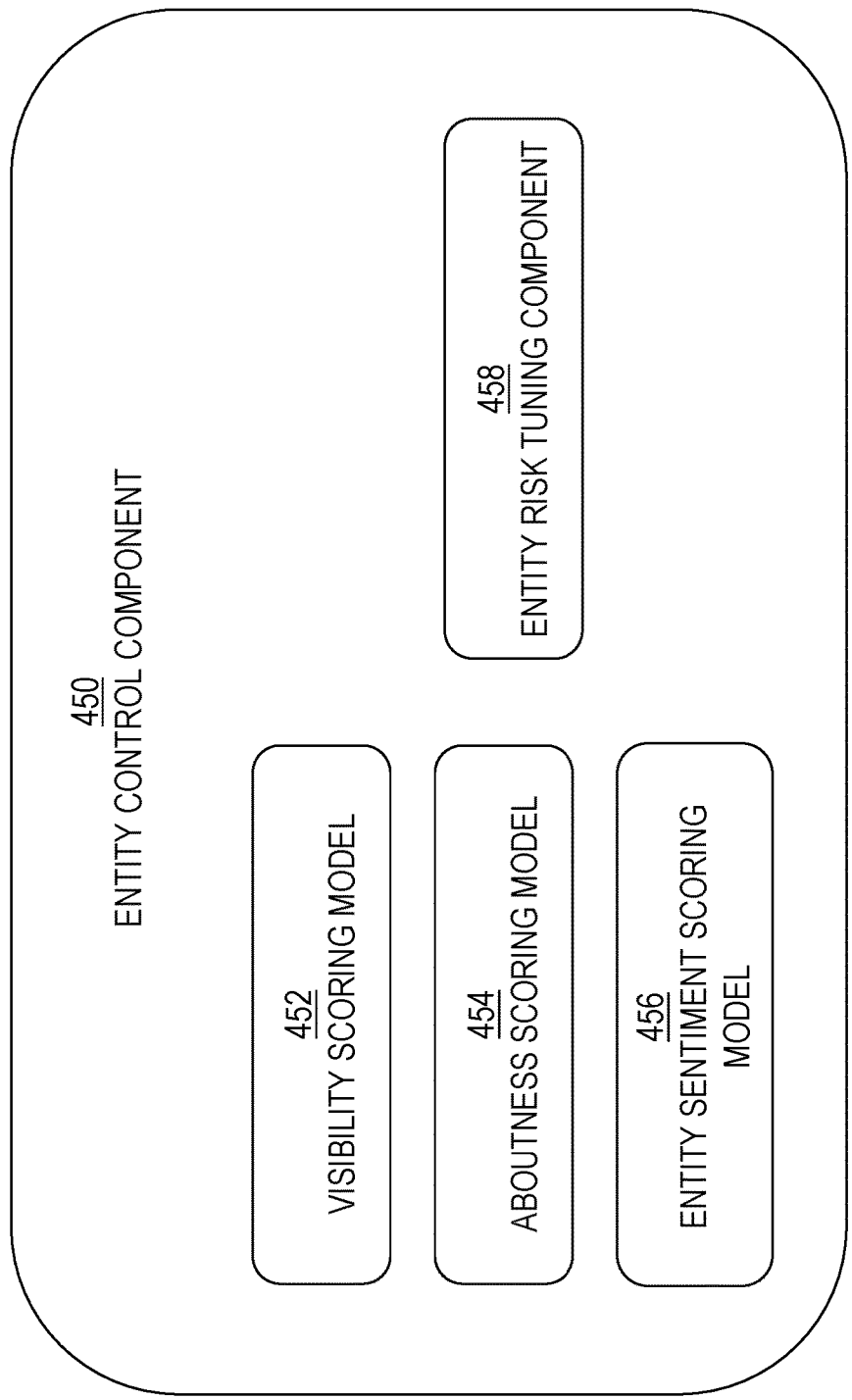
FIG. 4B is a block diagram that depicts an entity control component, which may be part of the entity linking component of FIG. 2, in an embodiment.

An embodiment of entity control component 234 is shown in FIG. 4B. FIG. 4B is a block diagram that depicts entity control component 450, which corresponds to entity control component 234 of risk evaluation component 230 of FIG. 2, in an embodiment. Entity control component 450 includes a visibility scoring model 452, an aboutness scoring model 454, an entity sentiment scoring model 456, and an entity risk tuning component 458, in an embodiment. Although not specifically shown in FIG. 4B, it will be understood that visibility scoring model 452, aboutness scoring model 454, entity sentiment scoring model 456, and entity risk tuning component 458 are bidirectionally communicatively coupled as needed to perform the functionality of entity control component 450.

In an embodiment, entity control component 450 operates on the output of disambiguation component 242; that is, entity control component 450 receives and analyzes a set of entity-content item pairs produced by disambiguation component 242. Entity control component 232 applies one or more of models 452, 454, 456 to the set of entity-content item pairs and synthesizes output of the models 452, 454, 456 to determine and output an entity-related risk score that can be used by risk evaluation component 230 in combination with a content-related risk score output by content control component 232 to determine an overall link risk score for the entity-content item pair. Portions of entity control component 232 may operate on data associated with entities identified by entity identification component 214 or, in some embodiments, portions of entity control component 232 may evaluate entities periodically, independently of entity identification component 214; for instance via an offline process.

Visibility scoring model 452 analyzes entity profile data stored in entity data store 132 and/or event data stored in event data store 134 that is associated with entities of entity management system 130 to determine, when multiple entities of the same name exist, the extent to which a particular entity is likely to be the correct match for an entity found in a content item. In some embodiments, visibility scoring model 452 analyzes entity data to assess the degree to which an entity appears to be genuine or fake, an impersonation, or a spam account.

Visibility scoring model 452 evaluates entities for risk that linking with an entity may produce undesirable results, such as propagating spam or inappropriate content. Visibility scoring model 452 outputs an entity visibility risk score for each entity that it analyzes. In an embodiment, visibility scoring model 452 includes a number of machine-learned models that have been trained to analyze engagement data, such as likes, follows, comments, and mentions in feed items, associated with entities to assess the genuineness or potential maliciousness of the entities. In an embodiment, visibility scoring model 452 includes a set of programmable rules that are configured to look for high-probability evidence of lack of genuineness or maliciousness, such as whether the entity name appears on a blacklist or a whitelist.

In an embodiment, visibility scoring model 452 operates in conjunction with disambiguation component 242 to determine, based on a combination of engagement data and entity profile data, which of multiple entities in entity management system 130 corresponds to a particular matching candidate entity found in a content item. Thus, in implementations of system 100 in which there is a preference not to link content items with corresponding target entities that may be considered high risk, i.e., malicious or not genuine or not relevant, the output of visibility scoring model 452 can be weighted highly via entity risk tuning component 458, or a corresponding threshold can be adjusted by entity risk tuning component 458, in order to filter out entity-content item pairs that are considered high risk prior to link creation by entity linking component 200.

Aboutness scoring model 454 analyzes text of a content item that contains a candidate entity that matches a target entity of entity management system 130 to determine whether or the extent to which the subject matter of the content item is related to or about the target entity. Aboutness scoring model 454 outputs an aboutness risk score for each content item/entity pair it analyzes.

To do this, in an embodiment, aboutness scoring model 454 includes a set of rules that assign aboutness scores depending on the position of the entity mention in the content item. For example, if an entity is mentioned in the title or summary section of a content item, or the entity is mentioned early in the content item and is mentioned often throughout the content item, aboutness scoring model 454 may assign a high aboutness score to the entity-content item pair. Conversely, if an entity is mentioned only infrequently in the content item; for example less than twice, aboutness scoring model 454 may assign a low aboutness score to the entity-content item pair. Entity-content item pairs that are not assigned low or high aboutness scores may be assigned a medium aboutness score. In another embodiment, aboutness scoring model 454 includes a machine learning-based model such as a deep learning model that predicts an aboutness score for each content item/entity pair and outputs the prediction as, for example, a probabilistic value between 0 and 1. Thus, for each entity mentioned in a content item, aboutness scoring model 454 is used to measure the aboutness of the content item with respect to that entity.

Use of aboutness scoring model 454 enables entity linking component 200 to distinguish situations in which, for example, a content item mentions an entity but only briefly; i.e., the entity is not the primary focus of the content item, from situations in which the content item is very salient with respect to a particular entity. To do this, output of aboutness scoring model 454 can be used by entity risk tuning component 458 to tune entity linking based on the visibility of a particular entity as measured, for example, by visibility scoring model 452. For example, if an entity has a large number of followers or is frequently mentioned in content items, and aboutness scoring model 454 produces a neutral aboutness score for a particular content item that mentions that particular entity, entity risk tuning component 458 may nonetheless rank that particular mention of the entity as low and filter out the content item, because that particular entity is mentioned in the news very frequently. On the other hand, if an entity is mentioned in the news rarely or for the very first time, even if the aboutness score is relatively low, entity risk tuning component 458 may rank the mention high and allow linking of the entity with the content item so that, for example, notifications of the entity mention are generated independently of the aboutness score.

Thus, certain implementations of system 100, entity risk tuning component 458 can be tuned based on a combination of entity visibility and content-entity aboutness, or a corresponding threshold can be adjusted by entity risk tuning component 458, either prior to or after entity matching by disambiguation component 242 or prior to or after entity linking by entity linking component 200. In some embodiments, the aboutness score produced by aboutness scoring model is used in combination with an overall entity mention frequency (i.e., a count of the total number of mentions of an entity in a set of content items divided by the number of content items in the set) in order to determine whether to filter out a content item or allow the content item to be linked with the entity.

Entity sentiment scoring model 456 performs an entity-oriented sentiment analysis on a content item containing a mention of a candidate entity. To do this, entity sentiment scoring model 456 includes a machine learning-based system that predicts the sentiment of a content item toward a particular entity. In an embodiment, entity sentiment scoring model 456 classifies a local context of an entity mention; that is, entity sentiment scoring model 456 analyzes text of a content item surrounding a mention of a candidate entity, such as the n words or sentences preceding or subsequent to the entity mention, for sentiment. In another embodiment, entity sentiment scoring model 456 includes a machine learning-based system that classifies the entity mention based on output of a syntactic dependency parsing process.

Whereas content sentiment scoring model 414 determines the overall sentiment of a content item irrespective of any particular entity, entity sentiment scoring model 456 determines whether a mention of an entity in a content item has a particular sentiment toward the mentioned entity. By incorporating entity sentiment scoring model 456, entity linking component 200 can address situations in which, for example, the overall sentiment of a content item is neutral but the content item mentions a particular entity in a sensitive, offensive, or delicate way. Thus, in certain implementations of system 100, entity risk tuning component 458 can be tuned based on entity-related sentiment, either prior to or after entity matching by disambiguation component 242 or prior to or after entity linking by entity linking component 200.

Entity risk tuning component 458 includes a set of programmable rules that can be tuned to adjust the relative importance of the various forms of entity-related risk analyses 452, 454, 456 in the context of a particular entity linking application. For example, entity risk tuning component 458 may allow multipliers or weighting values or thresholds associated with particular entity-related risk criteria to be specified and increased or decreased, so that output of visibility scoring model 452, aboutness scoring model 454, and entity sentiment scoring model 456 are appropriately weighted relative to one another to appropriately reflect the relative importance of each of the various models 452, 454, 456 to the overall entity risk score.

While some embodiments disclosed here are referred to as rule-based or machine learning-based, it should be understood that references to 'model' as used herein may refer to a rule-based decision engine, a machine learning-based system, or a combination of a rule-based decision engine and a machine learning-based system. That is, where an embodiment mentions a rule-based approach, it should be understood that a machine learning-based approach may be used in alternative embodiments, and vice versa. In general, a model as used herein may refer to a combination of computer programming code in which one or more decision-making algorithms are expressed; i.e., a machine learning algorithm or a set of rules, and one or more computer-implemented data structures that store data and/or parameters used by the model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
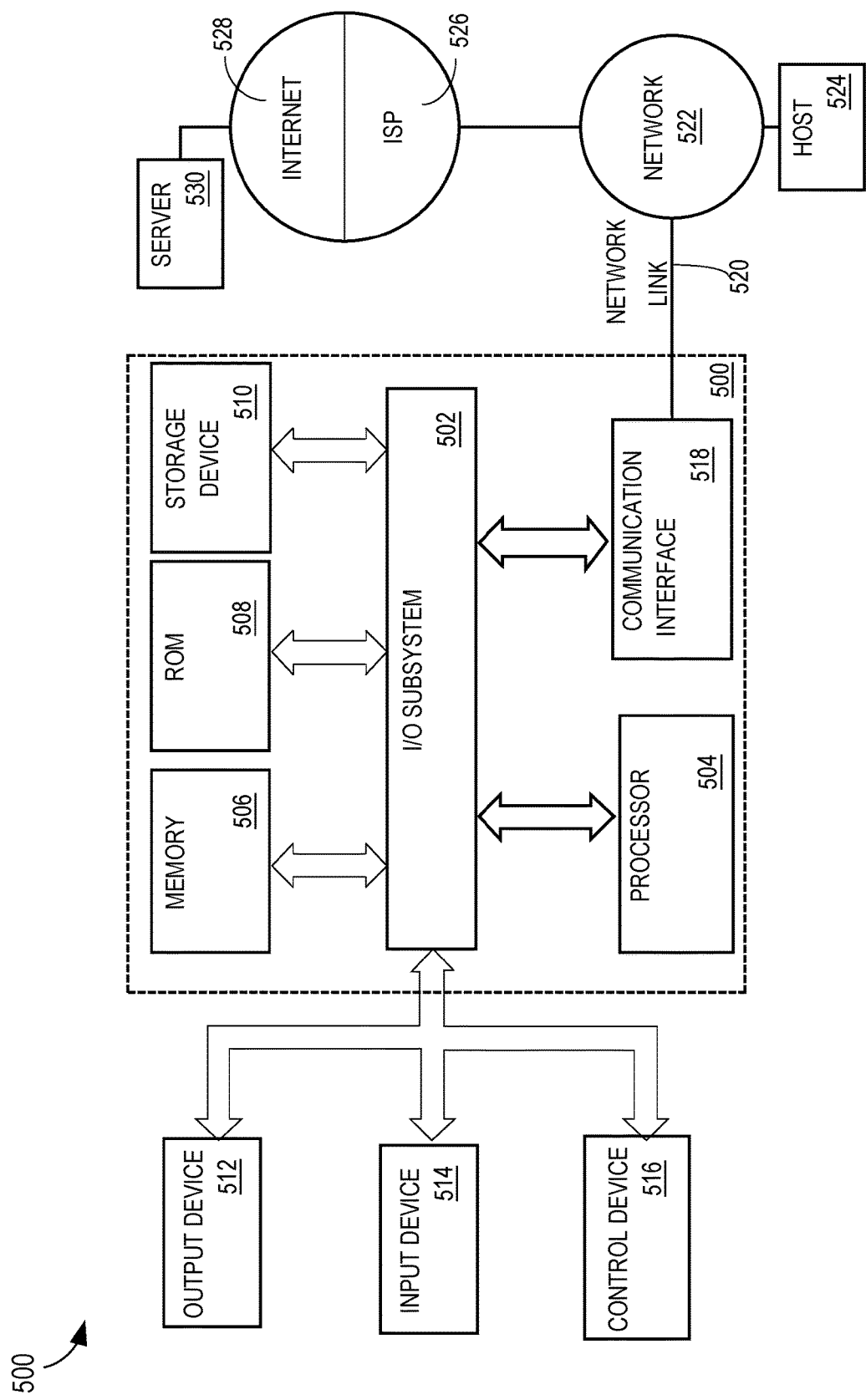
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

ADDITIONAL EXAMPLES

Illustrative examples of the technologies disclosed herein are provided below. An embodiment of the technologies may include any of the examples or a combination of the described below.

In an example 1, a method includes identifying a content item of a first digital data source as a candidate for linking with a target entity of a second digital data source by matching a candidate entity mentioned in the content item to the target entity in accordance with semantic similarity data computed between the candidate entity and the target entity; inputting at least one feature of the content item and at least one feature of the target entity to a set of digital models that analyze the at least one feature of the content item and the at least one feature of the target entity and determine and output qualitative data; based on the qualitative data, determining link risk data; based on the link risk data and the semantic similarity data, determining whether to generate a link between the content item and the target entity; where the method is performed by at least one computing device. An example 2 includes the subject matter of example 1, further including using a first model of the set of digital models, performing a sentiment analysis on the at least one feature of the content item to determine and output a sentiment score; based on the sentiment score, determining the link risk data. An example 3 includes the subject matter of example 2, further including using a second model of the set of digital models, performing a topic analysis on the at least one feature of the content item to determine and output a topic descriptor associated with the content item; based on the topic descriptor and the sentiment score, determining the link risk data. An example 4 includes the subject matter of any of examples 1-3, further including using a third model of the set of digital models, performing a malware analysis on the at least one feature of the content item and the at least one feature of the target entity; based on output of the malware analysis, determining the link risk data. An example 5 includes the subject matter of any of examples 1-4, further including performing a quantitative analysis of engagement data associated with the target entity; based on output of the quantitative analysis, determining the link risk data. An example 6 includes the subject matter of any of examples 1-5, further including using a fourth model of the set of digital models, analyzing a position feature of the candidate entity within the content item and a frequency of occurrence of the candidate entity within the content item to determine and output an aboutness score; based on the aboutness score, determining the link risk data. An example 7 includes the subject matter of any of examples 1-6, further including using a fifth model of the set of digital models, analyzing a sentiment feature of the content item relative to the candidate entity to determine and output an entity sentiment score that associates a sentiment with the candidate entity; based on the entity sentiment score, determining the link risk data. An example 8 includes the subject matter of any of examples 1-7, further including using a first set of set of digital models to analyze at least one feature of the content item to determine and output at least one content score; using a second set of set of digital models to analyze at least one feature of the target entity to determine and output at least one entity score; combining the at least one content score and the at least one entity score to determine the link risk data. An example 9 includes the subject matter of any of examples 1-8, further including tuning at least one threshold used to determine the link risk data in response to an input from a user of a software application that is operatively coupled to the second digital data source. An example 10 includes the subject matter of any of examples 1-9, further including causing at least a portion of the content item to be included in a digital notification transmitted to a user of a software application that is operatively coupled to the second digital data source. An example 11 includes the subject matter of example 10, further including determining and analyzing engagement data indicative of user engagement with the digital notification; and using the engagement data to tune at least one threshold used to determine the link risk data.

In an example 12, one or more storage media storing instructions which, when executed by one or more processors, cause: identifying a content item of a first digital data source as a candidate for linking with a target entity of a second digital data source by matching a candidate entity mentioned in the content item to the target entity in accordance with semantic similarity data computed between the candidate entity and the target entity; inputting at least one feature of the content item and at least one feature of the target entity to a set of digital models that analyze the at least one feature of the content item and the at least one feature of the target entity and determine and output qualitative data; based on the qualitative data, determining link risk data; based on the link risk data and the semantic similarity data, determining whether to generate a link between the content item and the target entity.

An example 13 includes the subject matter of example 12 where the instructions, when executed by the one or more processors, further cause, using a first model of the set of digital models, performing a sentiment analysis on the at least one feature of the content item to determine and output a sentiment score; based on the sentiment score, determining the link risk data. An example 14 includes the subject matter of example 13, where the instructions, when executed by the one or more processors, further cause, using a second model of the set of digital models, performing a topic analysis on the at least one feature of the content item to determine and output a topic descriptor associated with the content item; based on the topic descriptor and the sentiment score, determining the link risk data. An example 15 includes the subject matter of any of examples 12-14, where the instructions, when executed by the one or more processors, further cause, using a third model of the set of digital models, performing a malware analysis on the at least one feature of the content item and the at least one feature of the target entity; based on output of the malware analysis, determining the link risk data. An example 16 includes the subject matter of any of examples 12-15 where the instructions, when executed by the one or more processors, further cause performing a quantitative analysis of engagement data associated with the target entity; based on output of the quantitative analysis, determining the link risk data. An example 17 includes the subject matter of any of examples 12-16 where the instructions, when executed by the one or more processors, further cause, using a fourth model of the set of digital models, analyzing a position feature of the candidate entity within the content item and a frequency of occurrence of the candidate entity within the content item to determine and output an aboutness score; based on the aboutness score, determining the link risk data. An example 18 includes the subject matter of any of examples 12-17, where the instructions, when executed by the one or more processors, further cause, using a fifth model of the set of digital models, analyzing a sentiment feature of the content item relative to the candidate entity to determine and output an entity sentiment score that associates a sentiment with the candidate entity; based on the entity sentiment score, determining the link risk data. An example 19 includes the subject matter of any of examples 12-18 where the instructions, when executed by the one or more processors, further cause using a first set of set of digital models to analyze at least one feature of the content item to determine and output at least one content score; using a second set of set of digital models to analyze at least one feature of the target entity to determine and output at least one entity score; combining the at least one content score and the at least one entity score to determine the link risk data. An example 20 includes the subject matter of any of examples 12-19, where the instructions, when executed by the one or more processors, further cause tuning at least one threshold used to determine the link risk data in response to an input from a user of a software application that is operatively coupled to the second digital data source.

What is claimed is:
1. A method, comprising:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
based on the qualitative data, determining link risk data;
the link risk data indicates a likelihood of a negative link decision; and based on the link risk data and the semantic similarity data, determining whether to generate a link between the content item and the target entity;

wherein the method is performed by at least one computing device.

2. The method of claim 1, further comprising:
using a model of the set of digital models, performing a sentiment analysis on the at least one feature of the content item to determine and output a sentiment score; and
based on the sentiment score, determining the link risk data.

3. The method of claim 1, further comprising:
using a model of the set of digital models, performing a topic analysis on the at least one feature of the content item to determine and output a topic descriptor associated with the content item; and
based on the topic descriptor and a sentiment score, determining the link risk data.

4. The method of claim 1, further comprising:
using a model of the set of digital models, analyzing a position feature of the candidate entity within the content item and a frequency of occurrence of the candidate entity within the content item to determine and output an aboutness score; and
based on the aboutness score, determining the link risk data.

5. The method of claim 1, further comprising:
using a model of the set of digital models, analyzing a sentiment feature of the content item relative to the candidate entity to determine and output an entity sentiment score that associates a sentiment with the candidate entity; and
based on the entity sentiment score, determining the link risk data.

6. The method of claim 1, further comprising:
using a first set of digital models to analyze at least one feature of the content item to determine and output at least one content score;
using a second set of digital models to analyze at least one feature of the target entity to determine and output at least one entity score; and
combining the at least one content score and the at least one entity score to determine the link risk data.

7. The method of claim 1, further comprising:
tuning at least one threshold used to determine the link risk data in response to an input from a user of a software application that is operatively coupled to the second digital data source.

8. A method, comprising:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
using a model of the set of digital models, performing a malware analysis on the at least one feature of the content item and the at least one feature of the target entity;
based on the qualitative data and output of the malware analysis, determining link risk data; and
based on the link risk data and the semantic similarity data, determining whether to generate a link between the content item and the target entity.

9. A method, comprising:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
performing a quantitative analysis of engagement data associated with the target entity;
based on the qualitative data and output of the quantitative analysis, determining link risk data; and
based on the link risk data and the semantic similarity data, determining whether to generate a link between the content item and the target entity.

10. A method, comprising:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
based on the qualitative data, determining link risk data;
based on the link risk data and the semantic similarity data, determining whether to generate a link between the content item and the target entity; and
causing at least a portion of the content item to be included in a digital notification transmitted to a user of a software application that is operatively coupled to the second digital data source.

11. The method of claim 10, further comprising:
determining and analyzing engagement data indicative of user engagement with the digital notification; and
using the engagement data to tune at least one threshold used to determine the link risk data.

12. One or more storage media storing instructions which, when executed by one or more processors, cause:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
based on the qualitative data, determining link risk data;
the link risk data indicates a likelihood of a negative link decision; and
based on the link risk data and the semantic similarity data, determining whether to generate a link between the content item and the target entity.

13. The one or more storage media of claim 12, wherein the instructions, when executed by the one or more processors, further cause:
using a model of the set of digital models, performing a sentiment analysis on the at least one feature of the content item to determine and output a sentiment score; and
based on the sentiment score, determining the link risk data.

14. The one or more storage media of claim 12, wherein the instructions, when executed by the one or more processors, further cause:
using a model of the set of digital models, performing a topic analysis on the at least one feature of the content item to determine and output a topic descriptor associated with the content item; and
based on the topic descriptor and a sentiment score, determining the link risk data.

15. The one or more storage media of claim 12, wherein the instructions, when executed by the one or more processors, further cause:
using a model of the set of digital models, analyzing a position feature of the candidate entity within the content item and a frequency of occurrence of the candidate entity within the content item to determine and output an aboutness score; and
based on the aboutness score, determining the link risk data.

16. The one or more storage media of claim 12, wherein the instructions, when executed by the one or more processors, further cause:
using a model of the set of digital models, analyzing a sentiment feature of the content item relative to the candidate entity to determine and output an entity sentiment score that associates a sentiment with the candidate entity; and
based on the entity sentiment score, determining the link risk data.

17. The one or more storage media of claim 12, wherein the instructions, when executed by the one or more processors, further cause:
using a first set of digital models to analyze at least one feature of the content item to determine and output at least one content score;
using a second set of digital models to analyze at least one feature of the target entity to determine and output at least one entity score; and
combining the at least one content score and the at least one entity score to determine the link risk data.

18. The one or more storage media of claim 12, wherein the instructions, when executed by the one or more processors, further cause:
tuning at least one threshold used to determine the link risk data in response to an input from a user of a software application that is operatively coupled to the second digital data source.

19. One or more storage media storing instructions which, when executed by one or more processors, cause:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
using a model of the set of digital models, performing a malware analysis on the at least one feature of the content item and the at least one feature of the target entity;
based on the qualitative data and output of the malware analysis, determining link risk data; and
based on the link risk data and the semantic similarity data, determining whether to generate a link between the content item and the target entity.

20. One or more storage media storing instructions which, when executed by one or more processors, cause:
identifying a content item of a first digital data source as a candidate for linking with a target entity of a second digital data source by matching a candidate entity mentioned in the content item to the target entity in accordance with semantic similarity data computed between the candidate entity and the target entity;
inputting at least one feature of the content item and at least one feature of the target entity to a set of digital models that analyze the at least one feature of the content item and the at least one feature of the target entity and determine and output qualitative data;
performing a quantitative analysis of engagement data associated with the target entity;
based on the qualitative data and output of the quantitative analysis, determining the link risk data; and
based on the link risk data and the semantic similarity data, determining whether to generate a link between the content item and the target entity.

* * * * *